United States Patent
Machnicki et al.

(10) Patent No.: US 9,529,405 B2
(45) Date of Patent: Dec. 27, 2016

(54) SUBSYSTEM IDLE AGGREGATION

(71) Applicant: Apple Inc., Cupertino, CA (US)

(72) Inventors: Erik P. Machnicki, San Jose, CA (US); Gilbert H. Herbeck, Livermore, CA (US); Shu-Yi Yu, Cupertino, CA (US); Sebastian Skalberg, Campbell, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 14/459,482

(22) Filed: Aug. 14, 2014

(65) Prior Publication Data
US 2016/0048191 A1 Feb. 18, 2016

(51) Int. Cl.
G06F 1/32 (2006.01)

(52) U.S. Cl.
CPC ............ G06F 1/3237 (2013.01); G06F 1/324 (2013.01)

(58) Field of Classification Search
None
See application file for complete search history.

(56) References Cited

U.S. PATENT DOCUMENTS

| | | | |
|---|---|---|---|
| 6,088,806 A * | 7/2000 | Chee | G06F 1/3203 713/300 |
| 6,243,817 B1 | 6/2001 | Melo et al. | |
| 7,222,251 B2 | 5/2007 | Ahmad et al. | |
| 7,797,561 B1 | 9/2010 | Abdalla et al. | |
| 8,190,924 B2 | 5/2012 | Henmi | |
| 2004/0153678 A1 * | 8/2004 | Ahmad | G06F 1/3203 713/322 |
| 2004/0230850 A1 * | 11/2004 | Baumgartner | G06F 1/12 713/320 |
| 2008/0162770 A1 * | 7/2008 | Titiano | G06F 1/3203 710/309 |
| 2013/0042127 A1 | 2/2013 | Thomas et al. | |
| 2016/0018884 A1 * | 1/2016 | Schulz | G06F 1/3296 713/320 |

* cited by examiner

*Primary Examiner* — Fahmida Rahman
(74) *Attorney, Agent, or Firm* — Meyertons, Hood, Kivlin, Kowert & Goetzel, P.C.; Erik A. Heter

(57) ABSTRACT

A system and method for managing idleness of functional units in an IC is disclosed. An IC includes a subsystem having a number of functional units and an idle aggregation unit. When a particular functional unit determines that it is idle, it may assert an idle indication to the idle aggregation unit. When the respective idle indications are concurrently asserted for all of the functional units, the idle aggregation unit may assert and provide respective idle request signals to each of the functional units. Responsive to receiving an idle request unit, a given functional unit may provide an acknowledgement signal to the idle aggregation unit if no transactions are incoming. If all functional units have concurrently asserted their respective acknowledgement signals, the idle aggregation unit may provide an indication of the same to a clock gating unit, which may then gate the clock signal(s) received by the functional units.

19 Claims, 7 Drawing Sheets

SUBSYSTEM IDLE AGGREGATION

BACKGROUND

Technical Field

This disclosure is directed to integrated circuits, and more particularly, to controlling power consumption by subsystems having a number of functional units.

Description of the Related Art

In many integrated circuits (ICs), power savings is an important design consideration, particularly those used in systems that frequently operate on battery power. Accordingly, many ICs are designed to implement power saving features. Such power saving features may be used to conserve power in various circuits that are determined to not be performing useful work at a given time.

One method of conserving power is to perform clock gating. Clock gating may comprise inhibiting a clock signal from being provided to synchronous circuitry that is idle. This may result in dynamic power savings, as synchronous circuitry may not switch states when the clock signal is not provided.

A second method of preserving power is to perform power gating. Many circuits may be implemented in a gated power domain. When the circuitry in a gated power domain is idle, the power may be removed therefrom. This may realize additional power savings, particularly in synchronous circuits that were clock gated prior to power gating.

SUMMARY

A system and method for managing idleness of a number of functional units in an IC is disclosed. In one embodiment, an IC includes a subsystem having a number of functional units and an idle aggregation unit. When a particular functional unit determines that it is idle, it may assert an idle indication to the idle aggregation unit. When the respective idle indications are concurrently asserted for all of the functional units, the idle aggregation unit may assert and provide respective idle request signals to each of the functional units. Responsive to receiving an idle request signal, a given functional unit may provide an acknowledgement signal to the idle aggregation unit if no transactions are incoming. If all functional units have concurrently asserted their respective acknowledgement signals, the idle aggregation unit may provide a gating signal of the same to a clock gating unit, which may then gate the clock signal(s) received by the functional units.

In one embodiment, each functional unit is configured to assert a non-acknowledgement signal responsive to determining that an incoming transaction is pending subsequent to asserting its respective idle indication and prior to receiving the idle request from the idle aggregation unit. If any of the functional units asserts their respective non-acknowledgement signal, the idle aggregation unit may inhibit assertion of the gating signal, and thus the various functional units are not clock gated. The idle aggregation unit may also de-assert the idle request signals provided to each of the functional units responsive to receiving a non-acknowledgement signal from one of the functional units. Responsive to de-assertion of the respective idle request signals, functional units that have asserted their respective acknowledgement signal may de-assert that signal. Each functional unit may ignore incoming transactions when its respective acknowledgement signal is asserted. Incoming transactions may be serviced by a functional unit when its respective acknowledgment signal is not asserted.

BRIEF DESCRIPTION OF THE DRAWINGS

The following detailed description makes reference to the accompanying drawings, which are now briefly described.

Figure 1:
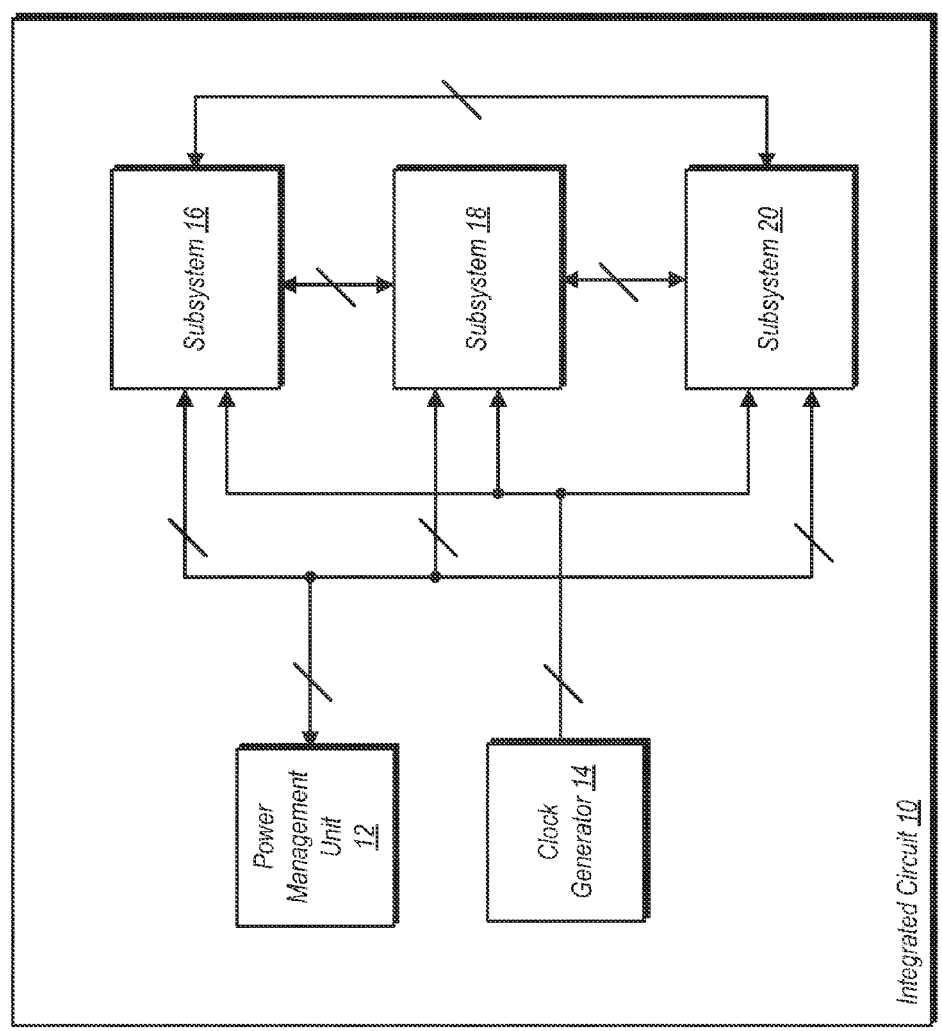
FIG. 1 is a block diagram of one embodiment of an IC.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, is a block diagram of one embodiment of an IC is shown. In the embodiment shown, IC 10 includes subsystem 16, 18 and 20. Each of the subsystems may include one or more functional circuit blocks implemented therein. Exemplary subsystems include processor cores, input/output (I/O) subsystems, graphics subsystems, and so forth. In some embodiments, the functional blocks of a particular subsystem may be part of a communications fabric within IC 10. In this embodiment, each of the subsystems is coupled to one another to enable communications to occur therebetween.

IC 10 in the embodiment shown also includes a power management unit 12. During operation, some functional blocks of a subsystem, or the entirety of a subsystem may become idle. As used herein, the term idle may be defined as a circuit or groups of circuits (e.g., functional circuit block or subsystem) that is not currently performing any useful work. Power management unit 12 may remove power from a functional block or subsystem that is determined to be idle. In some embodiments, functional blocks or entire subsystems may have their respectively received clock signal(s) inhibited (known as clock gating) prior to removing power therefrom.

Additional power management actions that may be performed by power management unit 12 include adjusting supply voltages received by the subsystems or functional blocks therein. For example, when a subsystem of functional unit is active but has a low workload, the supply voltage may be reduced. For higher workloads, the supply voltage may be increased.

IC 10 in the embodiment shown also includes a clock generator 14 coupled to provide clock signals to each of the subsystems (and thus synchronous circuits within the various functional units therein). Clock generator 14 may include one or more clock generating circuits therein (e.g., phase locked loops, clock dividers, clock multipliers, etc.) configured to generate respective clock signals to be provided to the various functional units of subsystems 16, 18, and 20. In one embodiment, clock generator 14 may receive one or more clock signals from a source external to IC 10, which may then be used as a basis for the clock signals provided to the various functional units. In another embodiment, clock generator 14 may include one or more on-board oscillators that generate periodic signals to provide the basis for the subsequently generated clock signals.

As noted above, clock gating may be performed on functional units within subsystems 16, 18, and 20, or on the entirety of subsystems themselves. The clock gating may be performed when a particular functional unit or all functional units of a subsystem are determined to be idle. Method and apparatus embodiments for clock gating an entire subsystem are discussed in further detail below.

Figure 2:
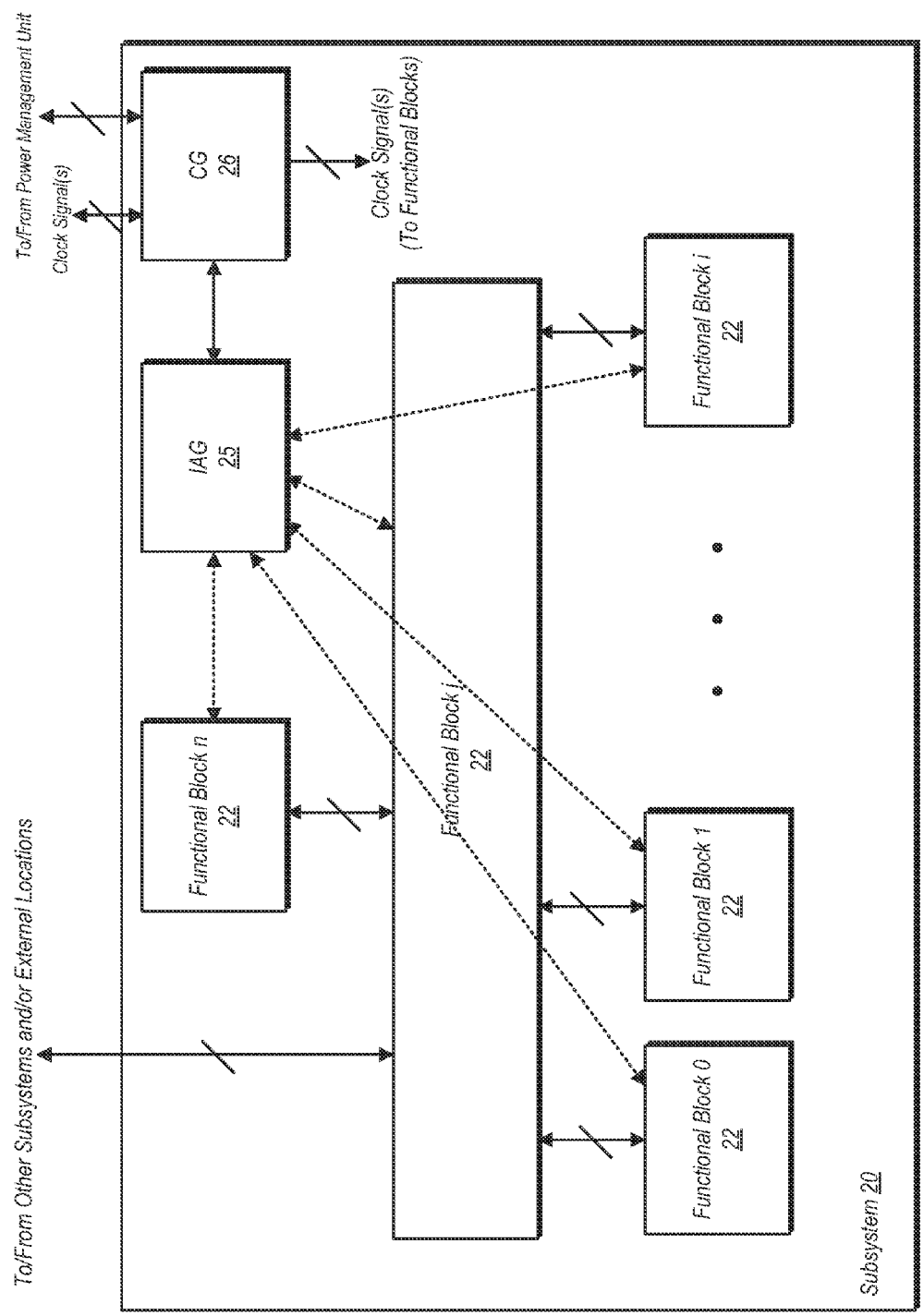
FIG. 2 is a block diagram illustrating one embodiment of a subsystem in an IC.

FIG. 2 is a block diagram illustrating one embodiment of a subsystem in an IC. In the embodiment shown, subsystem 20 includes a number of functional blocks 22, shown here as Functional Block 0 to Functional Block n. Each of the functional blocks may contain various circuits to perform useful work within the subsystem. Each functional block in the embodiment shown may be coupled to at least one other functional block, and at least one of the functional blocks may be coupled to other subsystems within IC 10 or to pins of IC 10 arranged for coupling to an external source.

Subsystem 20 in the embodiment shown also includes a clock gating circuit 26. Clock gating circuit 26 is coupled to receive one or more clock signals from clock generator 14, and may distribute these to the various functional blocks 22. In this particular example, each of the functional blocks 22 includes synchronous circuitry, and is thus coupled to receive at least one clock signal from clock gating circuit 26. It is noted however that functional blocks that do not include synchronous circuits are possible and contemplated, but are not shown here and are thus not coupled to receive any clock signal. It is further noted that some functional blocks 22 may be in a different clock domain than others, i.e. may be coupled to receive a different clock signal (e.g., one having a different frequency). However, embodiments are also possible and contemplated wherein each of the functional blocks 22 in subsystem 20 are coupled to receive the same clock signal.

Clock gating circuit 26 in the embodiment shown may inhibit the clock signal(s) provided to the various functional units 22 when it is determined that each of them is idle. The determination of idleness of all functional units 22 in subsystem 20 may be made by idle aggregation unit (IAG) 25. Each functional unit 22 shown in this particular embodiment is coupled to TAG 25. When a functional unit 22 determines itself to be idle, it may initiate communications with TAG 25 to indicate the same. TAG 25 may perform a handshake routine with each of the functional units 22. When the handshake routine is complete and all functional units of subsystem 20 have acknowledged their respective idleness, TAG 25 may provide an indication to clock gating circuit 26. Responsive to receiving the indication, clock gating circuit 26 then inhibit the respective clock signal(s) from being provided to each functional unit 22 of subsystem 20.

Figure 3:
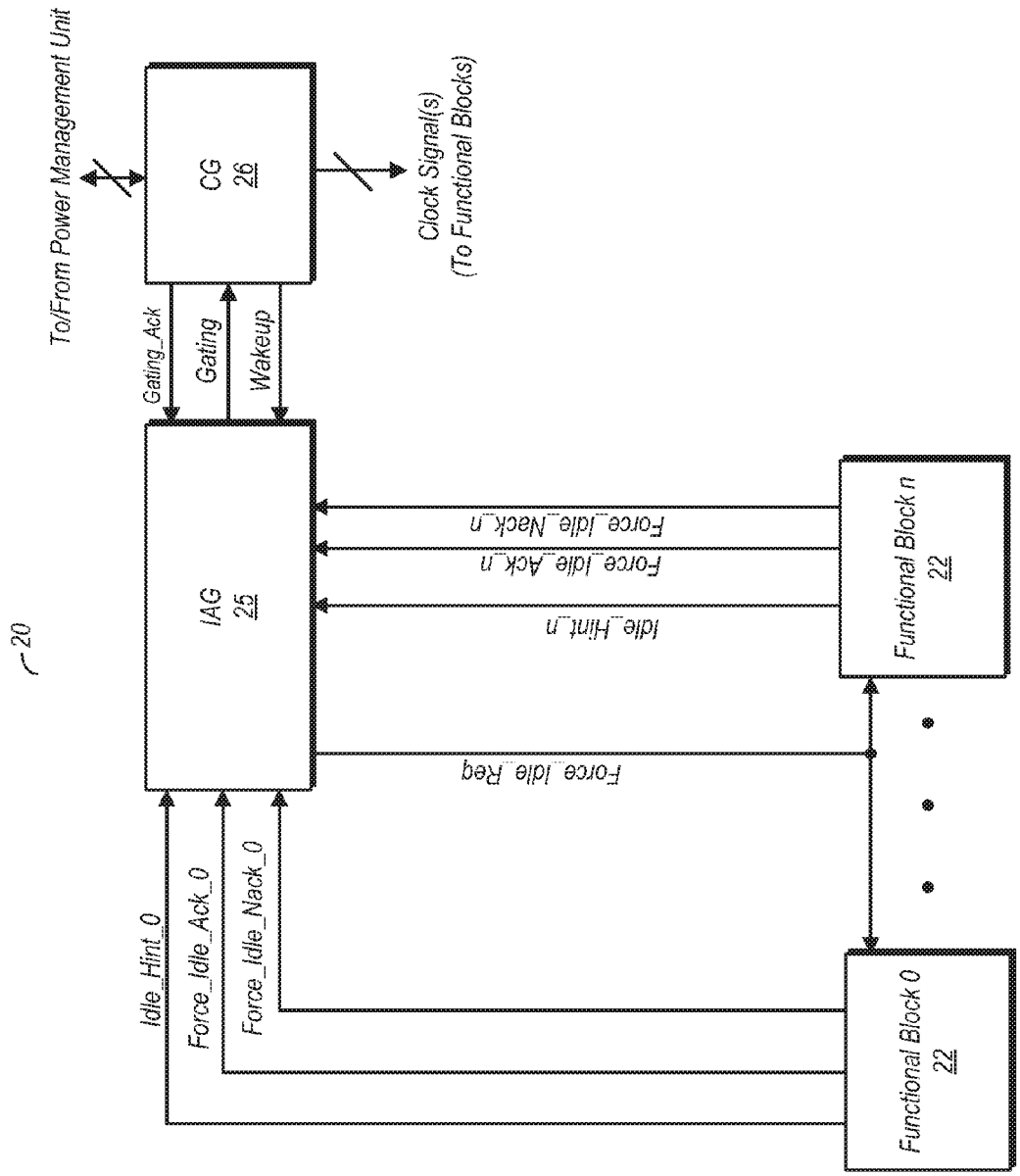
FIG. 3 is a block diagram illustrating the topology for one embodiment of idle management in a subsystem.

FIG. 3 is a block diagram illustrating the topology for one embodiment of idle management in a subsystem. In the embodiment shown, IAG 25 is shown as being coupled to two functional blocks 22, block 0 and block n. However, it is understood that IAG 25 may be coupled to each of the functional blocks 22 shown in FIG. 2 in the same manner as shown in FIG. 3.

In the embodiment shown, each functional block 22 has four signal connections to IAG 25. Three of the corresponding signals may be transmitted to IAG 25, while one of the corresponding signals is transmitted to the functional blocks 22. When a functional block determines that it is not performing useful work, it may convey an idle indication signal ('Idle_Hint') to the IAG 25. The idle indication signal from a given functional block 22 may remain asserted as long as the functional block determines itself to be idle.

If IAG 25 determines that each functional block 22 to which it is coupled is currently asserting its respective idle indication signal, it may respond by asserting the idle request signal ('Force_Idle_Req'). Each of the functional blocks 22 may receive the idle request signal from IAG 25, and may respond in one of two ways. If a given functional block 22 determines that it will remain idle and does not detect any incoming transactions, it may assert an acknowledgement signal ('Force_Idle_Ack'). Prior to asserting the acknowledgement signal, the functional block 22 may notify other functional blocks 22 to which it is coupled (directly or indirectly) that it may be going idle and may thus not be accepting incoming transactions thereafter. The functional block may also conduct any other operations to sever communications links with other functional blocks 22. After assertion of the acknowledgement signal, a given functional block 22 may not accept any incoming transactions until the acknowledgement signal is de-asserted responsive to a wakeup signal received from a source external to the subsystem 20.

If each of the functional blocks 22 in subsystem 20 responds to the idle request signal by assertion of a corresponding acknowledgement signal, IAG 25 may respond by asserting a clock gating signal ('Gating'). The assertion of a respective acknowledgement signal by each of the functional blocks 22 in a subsystem provides to IAG 25 an aggregated indication that all synchronous circuits in subsystem 20 are idle, and that clock gating may be performed to reduce dynamic power consumption. Clock gating circuit 26 may receive the asserted gating signal from IAG 25 and may respond thereto by gating (i.e. inhibiting) any clock signals that are provided to the various functional units 22 of subsystem 20. Additionally, clock gating circuit may also assert a gating acknowledgement signal ('Gating_Ack') that is received by IAG 25. IAG 25 may assume that no clock signal is available any time it is asserting the gating signal and any time it is receiving an asserted gating acknowledgement signal.

Clock gating may continue to be enforced until a wakeup signal is received by clock gating circuit 26 from an external source (e.g., power management unit 12).

If a given functional block 22 receives an incoming transaction subsequent to receiving the idle request signal, or otherwise determines that it has more work to perform, it may respond by asserting a non-acknowledgement signal ('Force_Idle_Nack'). The non-acknowledgment signal may indicate to IAG 25 that the given functional block 22 is currently unable to become/remain idle. Responsive to receiving a non-acknowledgement signal from any one of the functional blocks 22 (and subsequent to receiving a signal, acknowledgement or non-acknowledgement from each of the functional blocks 22), IAG 25, may de-assert the idle request signal provided to each of the functional blocks 22 of subsystem 20. This may serve as an indication that, for the time being, clock gating will not be occurring for the entirety of the subsystem. Any functional blocks 22 that asserted their respective acknowledgement signal may de-assert the same responsive to IAG 25 de-asserting the idle request signals. These functional units 22 may then re-establish communications links with other functional units.

When each functional block 22 of subsystem 20 is clock gated in the embodiment shown, an exit from the clock-gated state may occur when a wakeup signal is received by clock gating circuit 26 from a source external to subsystem 20. Clock gating circuit 26 may respond to the wakeup signal by providing a corresponding wakeup signal to IAG 25 as well as by discontinuing clock gating to the functional blocks 22 of subsystem 20. Responsive to receiving the wakeup signal from clock gating circuit 26, IAG 25 may de-assert the respective idle request signal provided to each of the functional blocks 22. De-assertion of the idle request signals in this scenario may indicate to each of the functional blocks 22 that an exit from the idle/clock gated state is imminent. The functional blocks 22 may respond by de-assertion of their respective idle acknowledgement signals, as well as by re-establishing communications lines with each other (and to points external to subsystem 20 if coupled thereto). Additionally, each functional blocks 22 of subsystem 20 may also de-assert its respective idle indication signal. After the clock signals have been received and communications links have been restored, the functional blocks 22 of subsystem 20 may resume normal operations.

Figure 4:
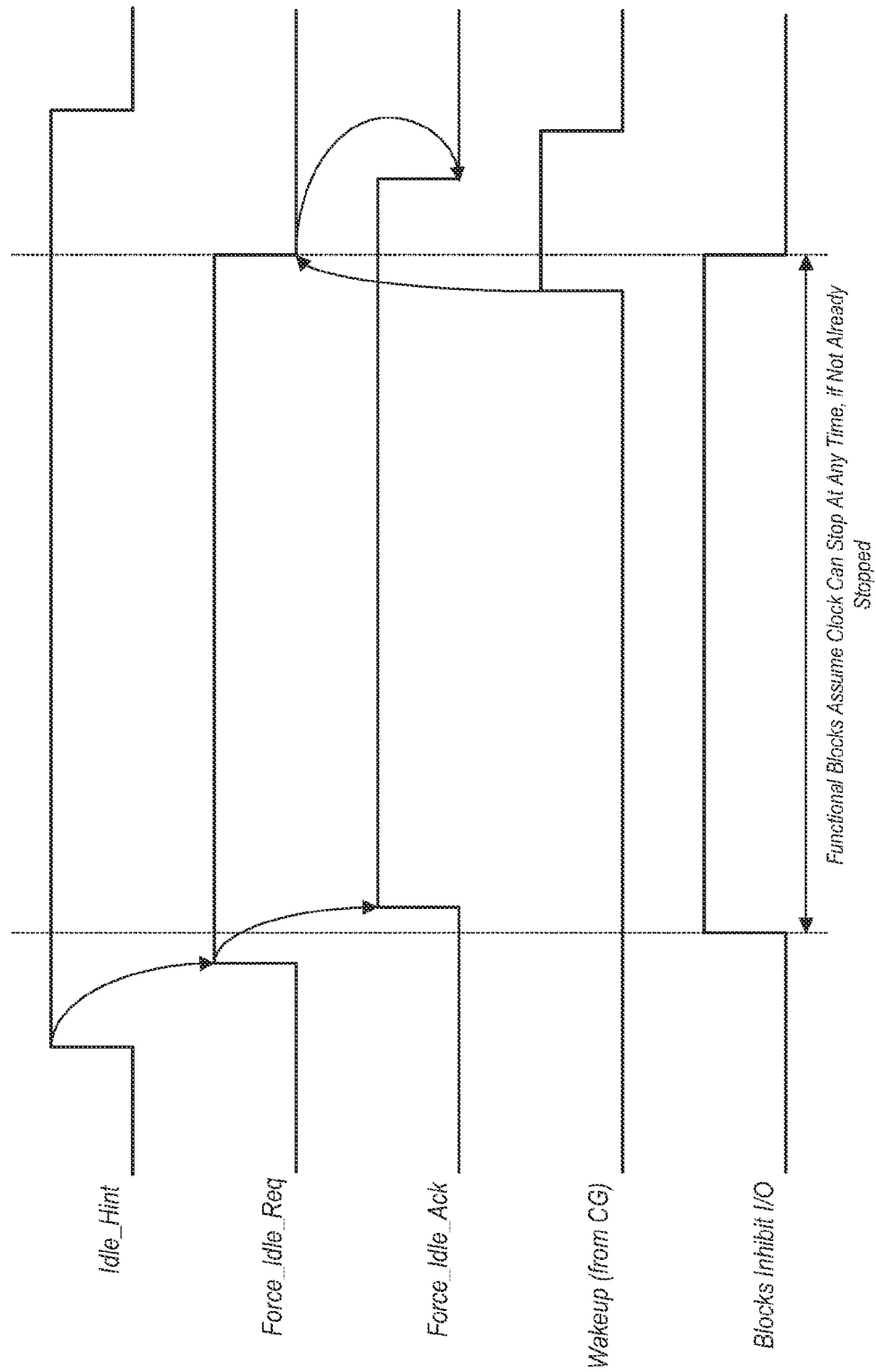
FIG. 4 is a timing diagram illustrating idle management operations in one embodiment of a subsystem in an IC.

FIG. 4 is a timing diagram illustrating idle management operations in one embodiment of a subsystem in an IC. It is noted that signals for only one functional block 22 are shown in this particular example, although it is to be understood that multiple functional blocks may assert/de-assert the same signals during the operation described herein.

Various functional blocks 22 of a subsystem may determine that they are idle at a given time, and may thus assert their respective 'Idle_Hint' (i.e. an idle indication) signal. Each functional unit 22 may hold its 'Idle_Hint' signal asserted as long as it is determined that it is idle.

Responsive to receiving an asserted 'Idle_Hint' from all functional blocks 22 of a subsystem, IAG 25 may assert the 'Force_Idle_Req' (i.e. an idle request) signal. Each of the functional blocks 22 of the subsystem 20 may detect the assertion of the 'Force_Idle_Req' signal. Responsive to receiving this signal and determining that it remains idle, the functional blocks 22 may prepare for entering a clock gated state. This may include notifying other functional blocks 22 in the subsystem as well as any external logic to which they are coupled that they may be entering a clock gated state, and may also include initiation of procedures to sever communications links. Upon severing communications links responsive to receiving the 'Force_Idle_Req' signal, a given functional block 22 may assert its corresponding 'Force_Idle_Ack' (i.e. acknowledgement signal).

Once the 'Force_Idle_Ack' signal is asserted for a given functional unit, it may no longer accept incoming transactions or perform I/O operations with other blocks, as indicated by the rising of the 'Block Inhibits I/O' signal (it is noted this is not an actual signal, but is shown here to graphically illustrate the time in which the functional units 22 are not accepting incoming transactions or transmitting outgoing transactions. During this time, the functional block 22 should also be prepared for the clock to be gated at any moment. Although not explicitly shown, IAG 25 may assert the gating signal responsive to determining that each of the functional units 22 of the subsystem has asserted its respective 'Force_Idle_Ack' signal, which may cause the clock gating circuit to inhibit the clock signal(s) provided to the subsystem.

A functional unit 22 may keep both its 'Idle_Hint' and 'Force_Idle_Ack' signals asserted for at least as long as IAG 25 keeps the corresponding 'Force_Idle_Req' signal asserted. If the clock gating circuit 26 asserts the wakeup signal, IAG 25 may respond by de-asserting the 'Force_Idle_Req'. This may serve as an indication to the various functional units 22 of subsystem 20 that any clock gating performed by clock gating circuit 26 is about to be discontinued. Each functional unit 22 may respond be de-asserting its respective 'Force_Idle_Ack' signal and its respective 'Idle_Hint'. Once the clock signal has been restored to the functional units 22, they may begin re-establishment of the communications links with other functional units 22 of the subsystem and any external units that they may also exchange communications during normal operations.

Figure 5:
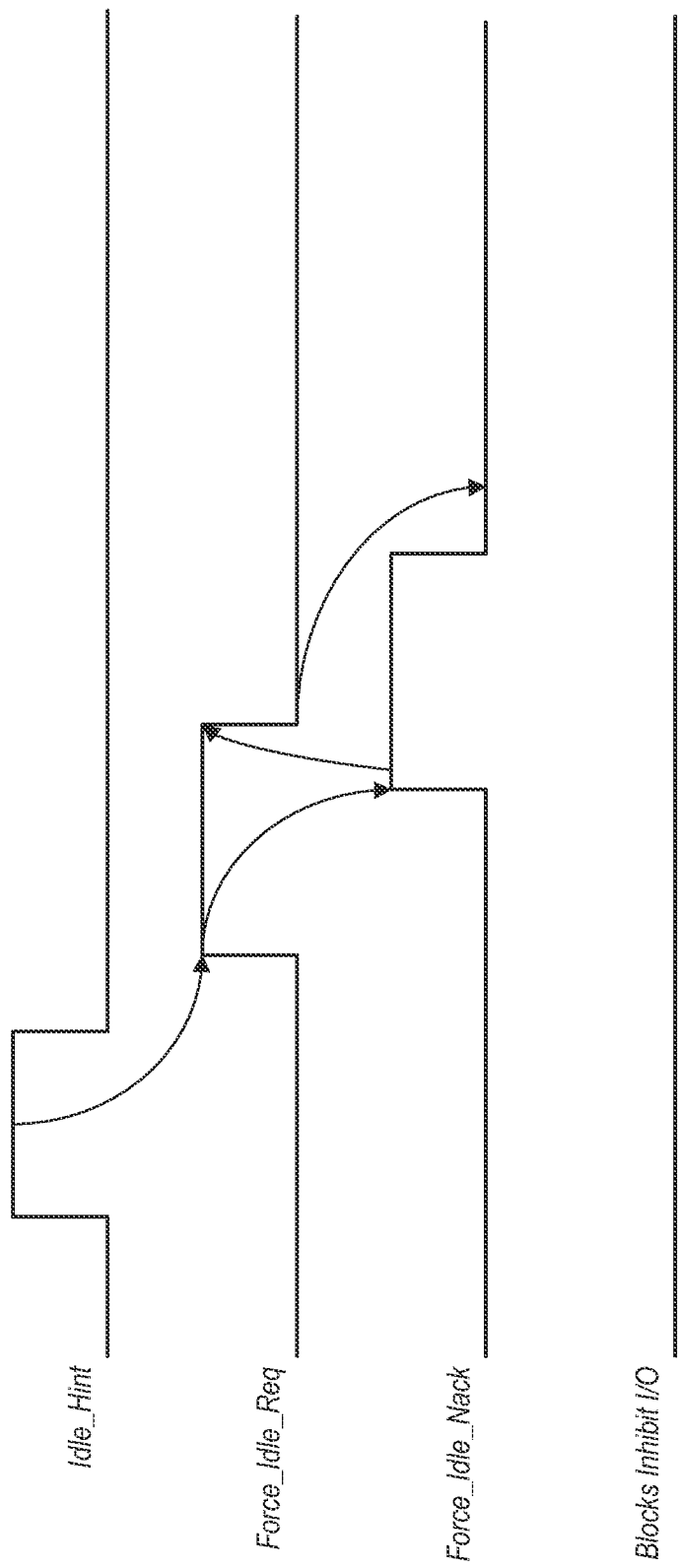
FIG. 5 is a timing diagram further illustrating idle management operations in one embodiment of a subsystem in an IC.

FIG. 5 is a timing diagram further illustrating idle management operations in one embodiment of a subsystem in an IC. In this particular example, a functional unit 22 may assert its 'Idle_Hint' signal, with IAG 25 responding by asserting the respective 'Force_Idle_Req'. However, prior to assertion of the 'Force_Idle_Req' signal, the functional unit may receive an incoming transaction, causing it to de-assert its idle hint signal. Since the functional unit 22 is servicing the transaction, it may assert its 'Force_Idle_Nack' to indicate to IAG 25 that it remains in an active state. Responsive to assertion of the 'Force_Idle_Nack' signal, IAG 25 may de-assert the 'Force_Idle_Req' signal for all functional units 22, including the one that asserted the 'Force_Idle_Nack' signal. Thereafter, the functional unit 22 that originally asserted the 'Force_Idle_Nack' signal may de-assert this signal.

Figure 6:
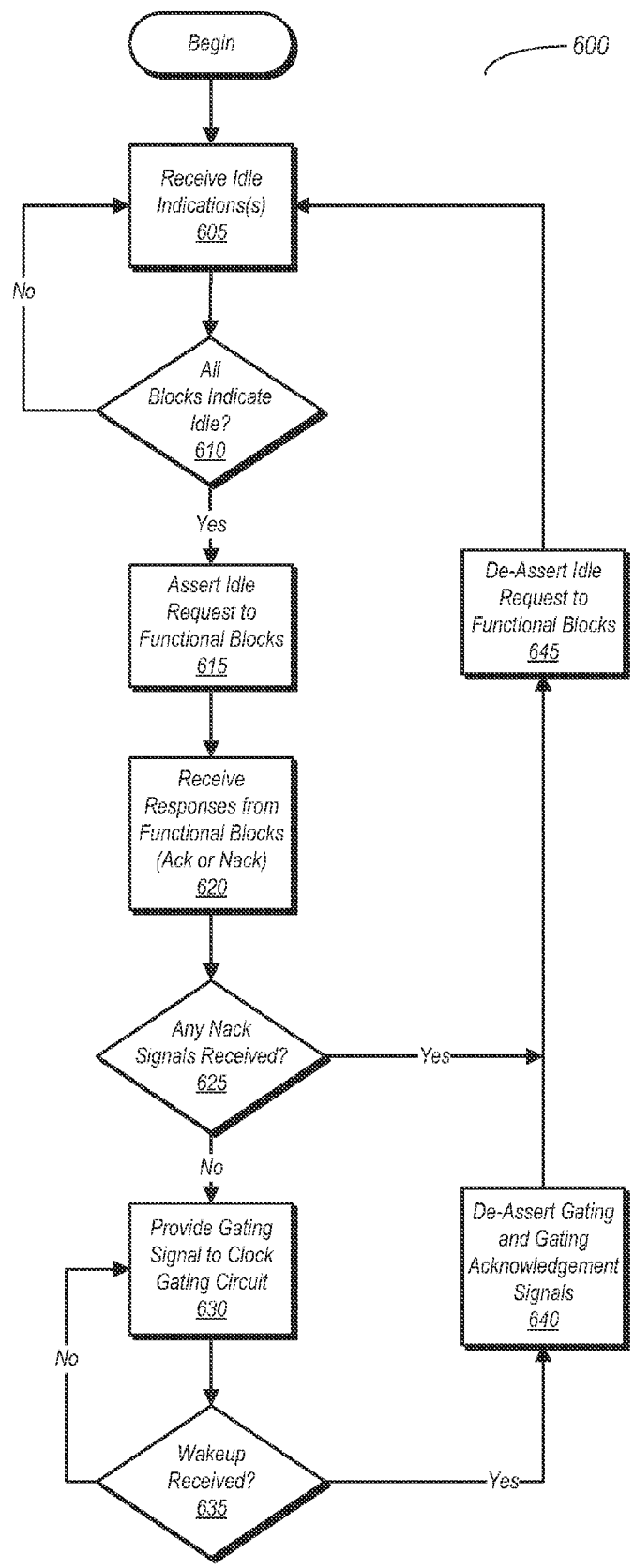
FIG. 6 is a flow diagram of one embodiment of a method for conducting idle management operations.

FIG. 6 is a flow diagram of one embodiment of a method for conducting idle management operations. Method 600 in the embodiment shown may be performed with any of the various hardware embodiments discussed above, as well as with hardware embodiments not explicitly discussed herein.

Thus, while method 600 is discussed in the context of various units discussed above, it is not limited to being performed with these units.

Method 600 begins with IAG 25 receiving idle indications from one or more of the functional blocks (block 605). If IAG 25 has not received idle indications from all functional blocks (block 610, no), then the method returns to block 605. If all functional blocks in the subsystem have asserted their respective idle indications (block 610, yes), then IAG 25 may respond by asserting an idle request signal that is provided to each of the functional blocks 22 (block 615).

Each functional block 22 may respond to the idle request signal by asserting an acknowledgement signal or a non-acknowledgement signal (block 620). If any one of the functional units asserts a non-acknowledgement signal (block 625, yes), then IAG 25 may de-assert the idle request signal (block 645). The method may then return to block 605. If no non-acknowledgment signals are received (and thus, all functional blocks 22 of the subsystem assert acknowledgement signals; block 625, no), then IAG 25 may assert a clock gating signal to be received by clock gating circuit 26 (block 630). If no wakeup signal is received (block 635, no), then IAG 25 may continue providing the clock gating signal (block 630), while each of the functional blocks 22 may be clock gated by clock gating circuit 26. If a wakeup signal is received (block 635, yes), IAG 25 may de-assert the gating signal with clock gating circuit 26 responding by de-asserting the gating acknowledgement signal (block 640). This may be followed by IAG 25 de-asserting the idle request signal provided to the functional blocks 22 (block 645). Upon de-assertion of the idle request signal, the functional blocks 22 may re-establish communications links and subsequently resume normal operations.

Figure 7:
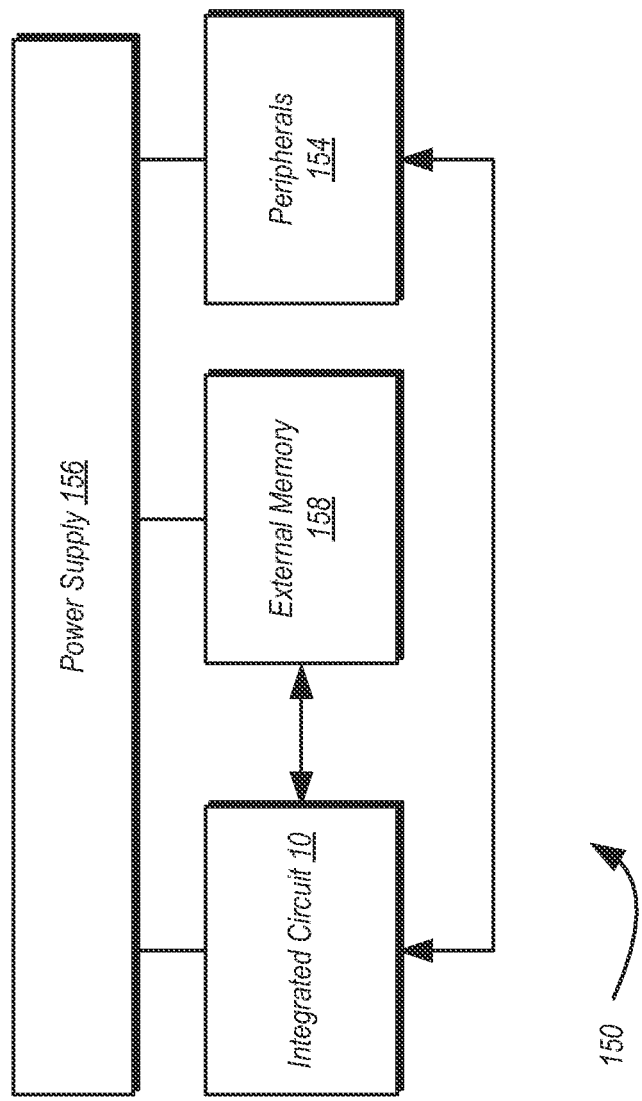
FIG. 7 is a block diagram of one embodiment of an exemplary system.

Turning next to FIG. 7, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMM5), etc.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of functional units;
an idle aggregation unit coupled to receive respective idle indication signals from each of the functional units, wherein responsive to determining that each of the functional units has concurrently asserted its respective idle indication signal, the idle aggregation unit is configured to provide an idle request signal to each of the functional units; and
a clock gating circuit configured to inhibit clock signals respectively received by each of the plurality of functional units responsive to receiving a gating indication from the idle aggregation unit and further configured to, responsive to receiving a first wakeup signal from an external source, assert and provide a second wakeup signal to the idle aggregation unit;
wherein each of the functional units is configured to provide to the idle aggregation unit one of an idle acknowledgement signal and an idle non-acknowledgement signal responsive to receiving the idle request signal, wherein the idle aggregation unit is configured to provide the gating indication responsive to determining that each of the functional units has asserted its respective idle acknowledgement signal, and wherein the clock gating circuit is configured to provide a gating acknowledgement signal to the idle aggregation unit responsive to receiving the gating indication, wherein responsive to receiving the idle request signal, a functional unit of the plurality of functional units is configured to determine whether to assert its respective idle acknowledgment signal if no incoming transaction is detected, and further configured to notify, prior to asserting its respective idle acknowledgement signal, other functional units of the plurality of functional units that it is to be idle and not accepting any incoming transactions.

2. The system as recited in claim 1, wherein the idle aggregation unit is configured to inhibit the gating indication from being provided to the clock gating circuit responsive to determining that one or more of the functional units has asserted its respective idle non-acknowledgement signal.

3. The system as recited in claim 1, further comprising a power management unit, wherein the clock gating circuit is configured to provide a gating indication to the power management unit responsive to inhibiting clock signals respectively received by each of the plurality of functional units.

4. The system as recited in claim 1, wherein each of the plurality of functional units is configured to assert its respective idle acknowledgement signal responsive to determining no incoming transactions are detected between assertion of its respective idle indication signal and receipt of the idle request signal from the idle aggregation unit.

5. The system as recited in claim 1, wherein each of the plurality of functional units is configured to assert its respective idle non-acknowledgement signal responsive to receiving an incoming transaction subsequent to asserting its idle indication signal and prior to receiving the idle request signal from the idle aggregation unit.

6. The system as recited in claim 1, wherein each of the plurality of functional units is configured to ignore incoming transaction if its respective idle acknowledgement signal is asserted.

7. The system as recited in claim 1, wherein the clock gating is further configured to:
discontinue inhibiting the clock signals responsive to receiving the first wakeup signal.

8. The system as recited in claim 7, wherein the idle aggregation unit is further configured to discontinue asserting the idle request signal and the gating indication responsive to receiving the second wakeup signal from the clock gating circuit, and wherein each of the plurality of functional units is configured to discontinue assertion of its respective idle acknowledgement signal responsive to the idle aggregation unit discontinuing assertion of the idle request signal, and wherein the clock gating circuit is configured to discontinue assertion of the gating acknowledgement signal responsive to the idle aggregation unit discontinuing to assert the gating indication.

9. A method comprising:
each of a plurality of functional units providing a respective idle indication signal to an idle aggregation unit;
responsive to determining that each of the functional units has concurrently asserted its respective idle indication signal, the idle aggregation unit providing an idle request signal to each of the functional units;
each of the functional units asserting one of an idle acknowledgement signal and an idle non-acknowledgement signal responsive to receiving the idle request signal, wherein each functional unit of the plurality of functional units determines whether to assert its respective idle acknowledgment signal based on determining that no incoming transactions are detected;
for each functional unit asserting its respective idle acknowledgement signal, notifying other functional units of the plurality of functional units that the functional unit is to be idle and no longer accepting incoming transactions, prior to asserting its respective idle acknowledgement signal;
the idle aggregation unit asserting a gating indication responsive to receiving respective idle acknowledgement signals from each of the functional units;
a gating circuit inhibiting clock signals respectively received by each of the plurality of functional units responsive to receiving the gating indication from the idle aggregation unit;
the gating circuit providing a gating acknowledgement signal to the idle aggregation unit responsive to inhibiting the clock signals;
the gating circuit receiving a first wakeup signal from an external source; and
responsive to receiving the first wakeup signal, the gating signal asserting and providing a second wakeup signal to the idle aggregation unit.

10. The method as recited in claim 9, further comprising the idle aggregation unit inhibiting the gating indication responsive determining that at least one of the plurality of functional units has asserted its respective idle non-acknowledgement signal.

11. The method as recited in claim 9, further comprising the gating circuit providing a gating indication to a power management unit responsive to inhibiting clock signals respectively received by each of the plurality of functional units.

12. The method as recited in claim 9, further comprising a selected one of the plurality of functional units asserting its respective idle acknowledgement signal responsive to determining that no incoming transactions are detected subsequent to asserting its respective idle indication signal and prior to receiving the idle request signal from the idle aggregation unit.

13. The method as recited in claim 9, further comprising a selected one of the plurality of functional units asserting its respective idle non-acknowledgement signal responsive to detecting an incoming transaction subsequent to asserting its idle indication signal and prior to receiving the idle request signal from the idle aggregation unit.

14. The method as recited in claim 9, further comprising a selected one of the plurality of functional units ignoring an incoming transaction if its respective idle acknowledgement signal is asserted.

15. The method as recited in claim 9, further comprising:
the gating circuit discontinuing inhibiting the clock signals responsive to receiving the first wakeup signal;
the idle aggregation unit discontinuing assertion of the idle request signal responsive to the gating circuit asserting the second wakeup signal;
the idle aggregation unit discontinuing assertion of the gating indication responsive to the gating circuit asserting the second wakeup signal; and
the gating circuit discontinuing assertion of the gating acknowledgement signal responsive to the idle aggregation unit discontinuing assertion of the gating indication.

16. An integrated circuit comprising:
a plurality of functional circuit blocks each configured to assert an idle indication when inactive;
a clock gating unit configured to inhibit respectively received clock signals from being provided to each of the plurality of functional circuit blocks responsive to receiving a gating signal; and
an idle control unit coupled to receive the idle indications from each of the plurality of functional circuit blocks, wherein the idle control unit is configured to assert and provide a force idle signal to each of the plurality of functional circuit blocks responsive to determining that respective idle indications are concurrently asserted for each of the plurality of functional circuit blocks;
wherein each of the plurality of functional circuit blocks is configured to assert a respective acknowledgement signal if no incoming transaction to that one of the functional circuit blocks is detected subsequent to asserting its respective idle indication and prior to receiving the force idle signal and further configured to notify other ones of the functional circuit blocks that it is entering an idle state and no longer accepting incoming transactions;
wherein the idle control unit is configured to assert the gating signal responsive to receiving respective acknowledgement signals from each of the plurality of functional blocks;
wherein the clock gating unit is configured to assert, responsive to receiving the gating signal, a gating acknowledgment signal provided to the idle control unit;
wherein each of the plurality of functional circuit blocks is configured to assert a respective non-acknowledgement signal if an incoming transaction to that one of the functional blocks is detected subsequent to asserting its respective idle indication and prior to receiving the force idle signal;

wherein the clock gating unit is configured to discontinue inhibiting the clock signals responsive to receiving a first wakeup signal and assert a second wakeup signal responsive to receiving the first wakeup signal, wherein the second wakeup signal is provided to the idle control unit.

17. The integrated circuit as recited in claim 16, wherein the idle control unit is configured to inhibit assertion of the gating signal responsive to determining that at least one of the plurality of functional circuit blocks asserted a non-acknowledgement signal responsive to receiving the force idle signal.

18. The integrated circuit as recited in claim 16, wherein each of the plurality of functional circuit blocks is configured to:
   ignore incoming transactions if its respective acknowledgement signal is asserted; and
   receive incoming transactions if its respective non-acknowledgement signal is asserted.

19. The integrated circuit as recited in claim 16, wherein the idle control unit is configured to discontinue assertion of the force idle signal responsive to assertion of the second wakeup signal.

* * * * *